Patented Oct. 4, 1949

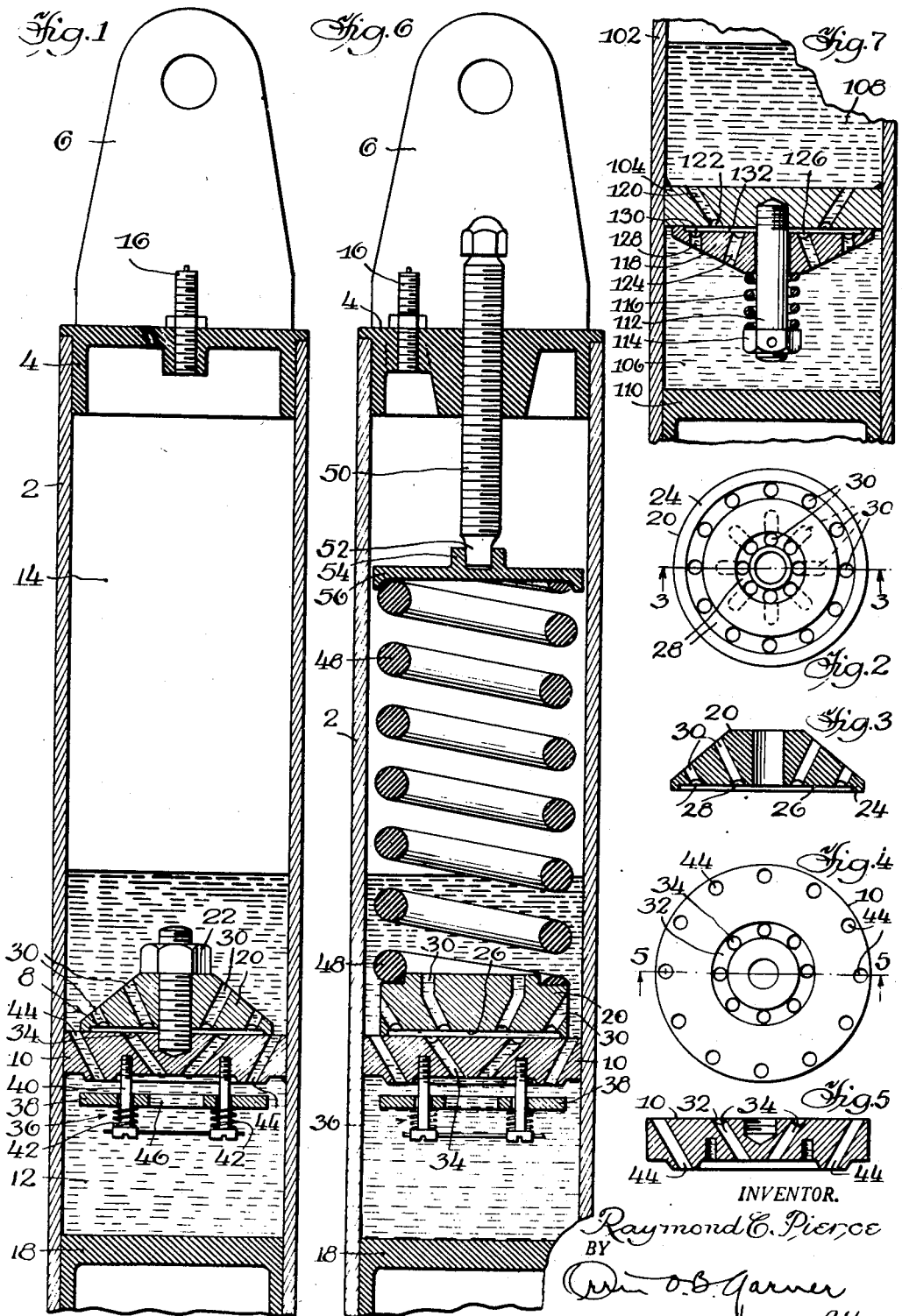

2,483,429

UNITED STATES PATENT OFFICE 2,483,429

SHOCK ABSORBER

Raymond C. Pierce, Chicago, Ill.

Application August 6, 1945, Serial No. 609,183

19 Claims. (Cl. 267—64)

1

This invention relates to hydraulic shock absorber devices and more particularly to a novel oleo shock strut commonly utilized in the connection between the landing gear and fuselage of an aircraft.

A general object of the invention is to provide novel means for metering the hydraulic fluid within the device, particularly on the closure stroke thereof, said metering means being particularly adapted to afford a relatively large frictional area along which the fluid may flow at relatively great velocity during metering thereof, thus increasing the amount of friction developed thereby.

A specific object of the invention is to provide a novel metering device such as above described wherein a pair of plates define an interstice therebetween communicating with ports through respective plates, the ports of one plate being in communication with the high pressure chamber of the strut cylinder, and the ports of the other plate being in communication with the low pressure chamber.

Another object of the invention is to design a metering device such as above described wherein the ports of respective plates are misaligned, thus preventing direct flow of hydraulic fluid through said ports between the high and low pressure chambers of the cylinder and directing the fluid through the interstice between the plates. By means of this arrangement the flow of fluid through the interstice increases the velocity thereof and the heat developed by the friction of the fluid passing through the ports is absorbed by the relatively large areas of the adjacent surfaces of the plates defining the interstice, whereupon the hydraulic fluid may flow passively through the associated ports at relatively low velocity into the low pressure chamber. It will be understood that this passive flow prevents foaming of the hydraulic fluid and entrapment therein of air bubbles as the hydraulic fluid compresses the air spring disposed within the low pressure chamber for returning the piston of the strut to its extended position subsequent to the closure stroke thereof.

Still another object of the invention is to design a metering device such as above described, particularly adapted to accommodate by-pass valve means for opening the high and low pressure chambers to direct communication on the extension stroke of the strut to insure rapid release or extension thereof.

In the drawings, Figure 1 is a longitudinal sectional view through a strut embodying the invention, portions of the structure being shown in elevation.

Figure 2 is a plan view of one of the metering plates, and Figure 3 is a sectional view taken on the line 3—3 of Figure 2.

2

Figure 4 is a plan view of the other metering plate, and Figure 5 is a sectional view taken on the line 5—5 of Figure 4.

Figure 6 is a longitudinal sectional view through a strut embodying a modification of the invention, portions of the structure being shown in elevation.

Figure 7 is a longitudinal sectional view through a strut embodying another modification of the invention, portions of the structure being shown in elevation.

Describing the invention in detail and referring first to the embodiment thereof illustrated in Figures 1-5 inclusive, the strut comprises a cylinder 2 including a head 4 with a perforated bracket 6 secured thereto and adapted for connection to the fuselage (not shown) of an associated aircraft. Carried by the cylinder 2 intermediate the ends thereof is a metering device or valve generally designated 8, said device comprising a plate or bulkhead 10 secured in any convenient manner to the cylinder 2, as by welding. The plate 10 divides the cylinder into a high pressure chamber 12 and a low pressure chamber 14, the latter containing at its upper extremity an air spring comprising a body of compressed air introduced into the cylinder through a conventional fitting or valve 16. A piston 18 is slidably fitted within the cylinder 2 in the high pressure chamber 12 thereof for reciprocation therewithin.

A plate 20 is secured by a bolt and nut assembly 22 to the plate 10, said plate 20 comprising an annular flange 24 on the lower surface thereof defining an annular recess 26 affording an interstice between the plates 10 and 20. This interstice is exaggerated in the drawings and is preferably of the order of six to twelve-thousandths of an inch in depth so as to accommodate a relatively thin layer of hydraulic fluid flowing therethrough, thereby enabling relatively efficient heat transfer between the fluid flowing through the interstice and the plates 10 and 20. A plurality of annular grooves 28, 28 are formed in the lower surface of the plate 20 communicating with ports or flow passages 30, 30 therethrough, said passages communicating with the low pressure chamber 14.

It may be noted that the passages 34, 34 are preferably approximately equidistantly spaced between the radially inner passages 30 and the radially outer passages 30, whereby on the compression or metering stroke of the strut, the hydraulic fluid may flow therethrough under approximately equal resistance into all of the passages 30.

The plate 10 is formed on its upper surface with an annular groove 32 disposed between the grooves 28, 28 and communicating with a plurality of ports or flow passages 34, 34 connected to the high pressure chamber 12.

By-pass valve means, generally designated 36, is provided for by-passing the metering device 8 on the extension stroke of the strut, said valve means 36 comprising an annular flapper plate 38 mounted on a plurality of pins or stud bolts 40, 40, each of which carries a relatively weak spring 42 adapted to urge the plate into engagement with the lower ends of ports or flow passages 44, 44 extending through the plate 10 around the plate 20. The flapper plate 38 comprises a central opening 46 through which the hydraulic medium within the cylinder 2 may be urged on the closure stroke of the piston 18.

Thus as the piston 18 is urged upwardly on its closure stroke within the high pressure chamber 12, the hydraulic fluid within the cylinder is urged from the high pressure chamber 12 through the opening 46 and the ports 34, 34. As the hydraulic fluid passes through the interstice afforded by the recess 26, the velocity of the fluid is increased, and heat is absorbed along the relatively large areas afforded by the adjacent surfaces of the plates 10 and 20. The fluid passes into the low pressure chamber 14 through the ports 30, 30 at relatively low velocity, thereby avoiding foaming of the hydraulic fluid within the chamber 14. It may be noted that the ports 30, 30 are angularly related to the longitudinal axis of the cylinder 2, whereby hydraulic fluid passing from these ports into the chamber 14 is directed against the adjacent cylinder surface to further decrease the velocity of said fluid and prevent foaming thereof.

On the extension stroke of the piston 18, as it moves downwardly within the chamber 12, the air spring forces the hydraulic fluid through the ports 44, 44, moving the flapper plate 38 to its open position against the resistance of the relatively weak springs 42, 42, as shown in Figure 1, thereby facilitating rapid release or extension of the strut.

Figure 6 illustrates a modification of the invention wherein parts corresponding to those shown in Figure 1 are identified by the same numerals. In this embodiment of the invention, the plate 20 is urged into engagement with the bulkhead or plate 10 by means of a spring 48 adjustably compressed against plate 20. The spring is compressed by a pin 50 in threaded engagement with the head 4 of the cylinder 2, said pin having a cylindrical nose 52 slidably fitted within a hollow boss 54 of a spring cap 56 bearing against the top of the spring 48. By means of this arrangement, the plate 20 is resiliently urged under adjustable pressure against the plate 10, thus accommodating movement of the plate 20 away from the plate 10 to enlarge the interstice between the plates. It will be understood that by adjusting the pressure of the spring 48, an adjustable metering effect may be obtained and, if desired, the recess 26 in the bottom of the plate 20 may be eliminated inasmuch as the interstice between the plates may be created by the above-mentioned movement of the plate 20 away from the plate 10.

Figure 7 illustrates another modification of the invention wherein the cylinder 102 is divided by a bulkhead wall or plate 104 into high and low pressure chambers 106 and 108 respectively, a piston 110 being reciprocated within the high pressure chamber. A bolt or pin 112 is secured to the plate 104 as by threaded engagement therewith, the lower end of the pin 112 being provided with a nut 114 adapted to compress a relatively weak spring 116 against a plate 118 which is thereby urged against the before-mentioned plate 104. The plate 104 is provided with a plurality of ports 120 communicating with an annular groove 122, and the plate 118 is provided with a plurality of radially inner ports 124 communicating with an annular groove 126, and a plurality of radially outer ports 128 communicating with an annular groove 130. The upper surface of the plate 118 is recessed as at 132 to provide an interstice between the plates 104 and 118.

In this embodiment of the invention, on the closure stroke of the strut, the hydraulic fluid within the high pressure chamber 106 is forced through the ports 124 and 128 into the interstice at 132 and upwardly therefrom through the ports 120 into the low pressure chamber 108 thereby effecting a metering of the hydraulic fluid within the cylinder 102. On the expansion or release stroke of the device, the pressure within the interstice 132 is greater than that within the chamber 106, thus forcing the plate 124 downwardly against the resistance of spring 116 to permit a great amount of the hydraulic fluid to flow from the ports 120 around the plate 118 and into the high pressure chamber 106 without passing through the ports 124 and 128, so that the metering action, if any, is negligible on the release stroke of the device.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a shock strut, a cylinder containing hydraulic fluid, valve means carried by said cylinder internally thereof for metering said fluid, said valve means comprising a wall within said cylinder dividing the same into axially spaced chambers, a valve plate, ports through said plate communicating with an interstice between said plate and said wall and communicating with one of said chambers, ports through said wall communicating with the other chamber and with said interstice, the ports through said wall being misaligned with respect to the ports through said plate, a piston slidably fitted within one of said chambers for reciprocation therewithin, ports through said wall around the margins of said plate and communicating with said chambers, and valve means for accommodating direct communication between said chambers through said last-mentioned ports independently of said first and second-mentioned ports on the extension stroke of the strut.

2. In a shock strut, a cylinder containing hydraulic fluid, valve means carried by said cylinder internally thereof for metering said fluid, said valve means comprising a wall member within said cylinder dividing the same into axially spaced chambers, a valve plate member, ports through said plate member communicating with an interstice between said members and communicating with one of said chambers, ports through said wall member communicating with the other chamber and with said interstice, the ports through said wall member being misaligned with respect to the ports through said plate member, and a piston slidably fitted within one of said chambers for reciprocation therewithin, the ports communicating with the chamber remote from said piston being divergent with respect to the longitudinal axis of the strut for directing fluid against the sides of said cylinder on the closure stroke of the strut.

3. In a shock strut, a cylinder containing hydraulic fluid, a bulkhead member fixed within said cylinder, a valve plate member mounted within said cylinder and defining an interstice with said bulkhead member, a plurality of alternately arranged annular grooves in the adjacent surfaces of said members communicating with said interstice, ports through respective members communicating with the grooves therein, a plurality of ports through said bulkhead member around said plate member, valve means for closing said last-mentioned ports on the closure stroke of the strut and for opening said last-mentioned ports on the extension stroke of the strut, and a piston slidably fitted within said cylinder for reciprocation therewithin.

4. In a shock strut, a cylinder containing hydraulic fluid, valve means carried by said cylinder internally thereof for metering said fluid, said valve means comprising a wall within said cylinder dividing the same into axially spaced chambers, one of said chambers being a low pressure chamber and the other of said chambers being a high pressure chamber, a valve plate, ports through said plate communicating with an interstice between said plate and said wall and communicating with said one chamber, ports through said wall communicating with the other chamber and with said interstice, the ports through said wall being misaligned with respect to the ports through said plate, and a piston slidably fitted within said other chamber for reciprocation therewithin, the ports in said plate diverging with respect to the longitudinal axis of said strut for directing fluid against the sides of said cylinder on the closure stroke of said strut to prevent foaming of said fluid.

5. In a hydraulic shock strut, a cylinder, a bulkhead fixed therein dividing said cylinder into high and low pressure chambers, a plate in the low pressure chamber defining an interstice with said bulkhead, ports through said plate communicating with said interstice and with said low pressure chamber, ports through said bulkhead communicating with said interstice and with said high pressure chamber, and a piston slidably fitted within said high pressure chamber for reciprocation therewithin, the ports through said bulkhead being misaligned with respect to the ports through said plate, the ports in said plate being disposed at an acute angle with respect to the wall of said cylinder for directing fluid thereagainst on the closure stroke of said strut to prevent foaming of said fluid.

6. In a hydraulic shock strut, a cylinder, a bulkhead fixed therein dividing said cylinder into high and low pressure chambers, a plate in the low pressure chamber defining an interstice with said bulkhead, a plurality of concentric annular grooves in the adjacent sides of said bulkhead and plate and communicating with said interstice, ports through said plate communicating with the grooves therein and with said low pressure chamber, ports through said bulkhead communicating with the grooves therein and with said high pressure chamber, a piston slidably fitted within said high pressure chamber for reciprocation therewithin, and by-pass valve means for accommodating flow of fluid between said chambers on the extension stroke only of the strut.

7. In a hydraulic shock absorber device, a cylinder containing an air spring at its upper end and a body of hydraulic fluid adapted to compress said spring, means mounted in said cylinder for metering said fluid, said means comprising a pair of abutting plates, an interstice therebetween, and a plurality of ports through each plate misaligned with respect to the ports of the other plate and communicating with said interstice, and a piston slidably fitted within said cylinder for reciprocation therewithin, said ports and interstice being the sole means for metering said fluid on the closure stroke of said device.

8. In a hydraulic shock absorber device, a cylinder containing hydraulic fluid, means mounted on said cylinder therewithin for metering said fluid, said means comprising a pair of plates, an interstice therebetween, channels in the adjacent sides of said plates concentrically arranged with respect to each other and communicating with said interstice, and a plurality of ports through each plate misaligned with respect to the ports of the other plate and communicating with the channels in their respective plates, a piston reciprocal within said cylinder, and valve means for by-passing said ports on the extension stroke only of the device to facilitate rapid extension thereof.

9. In a shock strut, a cylinder containing hydraulic fluid, a bulkhead member fixed within said cylinder dividing the same into axially spaced chambers, a valve plate member mounted within said cylinder and defining an interstice with said bulkhead member, a plurality of alternately arranged annular grooves in the adjacent surfaces of respective members communicating with said interstice, ports through respective members connected to the grooves therein, spring-seating means within said cylinder, spring means seated against said plate and said last-mentioned means and reacting therebetween for urging said plate against said bulkhead member, and a piston slidably fitted within said cylinder for reciprocation therewithin, said plate member at its marginal edges being spaced from said cylinder and being movable away from said bulkhead member against the resistance of said spring means to enlarge the interstice between said members under certain closure conditions of said strut whereby said fluid is permitted escape between said members and between the marginal edges of said plate member and said cylinder and into the adjacent of said chambers.

10. In a shock strut, a cylinder containing hydraulic fluid, a bulkhead member fixed within said cylinder, a valve plate member mounted on the bulkhead member and defining an interstice with said bulkhead member and spaced at its edges from said cylinder, a plurality of alternately arranged annular grooves in the adjacent surfaces of said members communicating with said interstice, ports through respective members communicating with the grooves therein, spring means within said cylinder urging said plate member against said bulkhead member, said plate member on the extension stroke of said strut being movable away from said bulkhead member for thus affording a passage for said fluid between said members and thence around the edges of said plate member and the adjacent side of said cylinder independently of the ports in said plate member, whereby rapid extension of said strut is facilitated, and a piston slidably fitted within said cylinder for reciprocation therewithin.

11. In a shock strut, a cylinder containing hydraulic fluid, a bulkhead member fixed within said cylinder, a valve plate member mounted within said cylinder and defining an interstice with said bulkhead member, spring-seating means within said cylinder, spring means compressed by and between said valve plate and said spring-seating means and urging the former against said bulkhead member, a plurality of alternately arranged annular grooves in the adjacent surfaces of said members communicating with said interstice, ports through respective members communicating with the grooves therein, and a piston slidably fitted within said cylinder for reciprocation therewithin.

12. In a hydraulic shock strut, a cylinder, a bulkhead fixed therein dividing said cylinder into high and low pressure chambers, a plate in the low pressure chamber defining an interstice with said bulkhead, ports through said plate communicating with said interstice and with said low pressure chamber, ports through said bulkhead communicating with said interstice and with said high pressure chamber, and a piston slidably fitted within said high pressure chamber for reciprocation therewithin, at least certain of the ports in said plate being diagonally inclined towards the wall of said cylinder for directing fluid thereagainst on the compression stroke of said strut.

13. In a hydraulic shock absorber device, a cylinder containing hydraulic fluid, a piston reciprocal within said cylinder, and means for metering said fluid comprising a pair of plates, at least one of which is fixed with respect to the cylinder, and ports through respective plates communicating with an interstice therebetween, the ports of respective plates being in misalignment to prevent direct communication therebetween, said interstice being of extremely shallow depth whereby fluid passing therethrough, upon actuation of said device, is caused to be spread in a thin layer to afford a large area of contact with said plates for effecting rapid dissipation of heat from said fluid.

14. In a hydraulic shock absorber, a cylinder containing hydraulic fluid, a piston reciprocal within said cylinder, and means for metering said fluid comprising a pair of plates, at least one of which is fixed with respect to the cylinder, a plurality of concentrically arranged circular grooves in the adjacent surfaces of said plates communicating with an interstice therebetween, ports through respective plates communicating with said grooves therein, and valve means for by-passing said metering means during movement of said piston in one direction only.

15. In a hydraulic shock absorber device, a cylinder containing hydraulic fluid, means within said cylinder and carried thereby for metering said fluid, said means comprising a pair of plates, an interstice therebetween, and a plurality of ports through each plate misaligned with respect to the ports of the other plate and communicating with said interstice, and a piston reciprocal within said cylinder, said interstice being of extremely small depth accommodating, upon the closure of said absorber, the flow of fluid therethrough in a thin layer whereby said fluid is afforded a relatively large area of contact with the adjacent surfaces of said plates to effect a rapid transfer of heat from said fluid to said plates.

16. In a hydraulic shock absorber, a cylinder containing hydraulic fluid, means for metering said fluid comprising a pair of plates, at least one of which is fixed with respect to the cylinder dividing the same into chambers, the other of said plates being seated against the one plate within one chamber, a piston reciprocal within the other of said chambers, and ports through respective plates communicating with an interstice therebetween and with respective chambers, the ports of said other plate being inclined toward the wall of said cylinder against the inner surface thereof during the closure stroke of said shock absorber whereby foaming of said fluid is prevented.

17. A metering element for a hydraulic shock absorber fluid metering valve comprising a rigid member having a plurality of spaced ports extending therethrough adjacent the marginal edge thereof, a plurality of other ports intermediate the center point of said member and said first-mentioned plurality of ports, all of said ports being divergent with respect to said center point, a recess on the side of said member towards which said ports converge, and a plurality of concentric grooves in said member within said recess, one of said grooves connecting said first-mentioned ports and the other of said grooves connecting the other of said ports.

18. A metering valve for a hydraulic shock strut comprising a pair of separable members seated against each other and defining an interstice therebetween, a plurality of alternately arranged annular grooves in the adjacent surfaces of said members and communicating with said interstice, ports through respective members communicating with the grooves therein, a plurality of ports through one member around the margin of the other member, and valve means for closing and opening said last-mentioned ports to permit fluid to flow therethrough in one direction only.

19. In a shock strut, a top follower in the form of a cylinder containing hydraulic fluid, a wall member within said cylinder dividing the same into high and low pressure chambers, a gas spring in the low pressure chamber contacting the upper surface of said fluid, a bottom follower in the form of a piston reciprocal within the high pressure chamber, a plate member defining a metering interstice with said wall member, ports through one of said members connecting the high pressure chamber to said interstice, and ports through the other member connecting the low pressure chamber to said interstice, said last-mentioned ports extending upwardly and outwardly from the longitudinal axis of said cylinder to points closely adjacent internal portions of said cylinder in said low pressure chamber to direct hydraulic fluid against said portions thereby diminishing foaming of said fluid and consequent emulsion of said gas and said fluid.

RAYMOND C. PIERCE.

REFERENCES CITED

The following references are of record in the file of this patent:

UNITED STATES PATENTS

| Number | Name | Date |
| --- | --- | --- |
| 1,855,064 | Messier | Apr. 19, 1932 |
| 1,950,995 | Piccard | Mar. 13, 1934 |
| 2,101,265 | Mercier | Dec. 7, 1937 |
| 2,132,854 | Knott | Oct. 11, 1938 |
| 2,196,089 | Wallace | Apr. 2, 1940 |
| 2,210,448 | Dodge | Aug. 6, 1940 |

FOREIGN PATENTS

| Number | Country | Date |
| --- | --- | --- |
| 114,161 | Austria | Sept. 10, 1929 |